May 3, 1960 R. E. ANDERSON 2,935,681
CONTOUR MEASURING METHOD AND PROBE
Filed Aug. 31, 1956
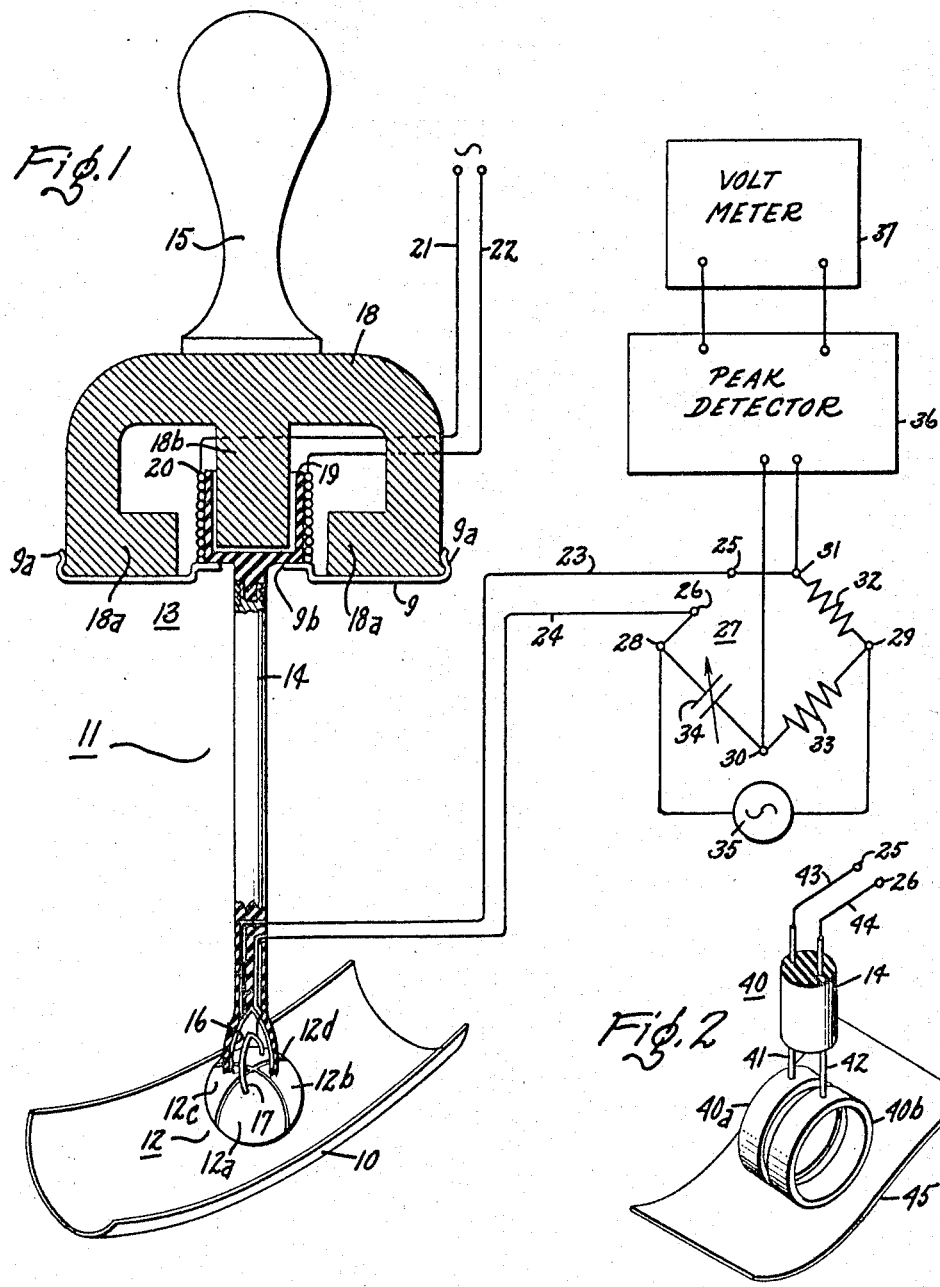
Inventor
Roy E. Anderson
by Urban H. Faubion
His Attorney

United States Patent Office 2,935,681
Patented May 3, 1960

2,935,681
CONTOUR MEASURING METHOD AND PROBE

Roy E. Anderson, Schenectady, N.Y., assignor to General Electric Company, a corporation of New York Application August 31, 1956, Serial No. 607,456

9 Claims. (Cl. 324—61)

This invention relates to a capacitance probe and method of using such a probe. More particularly, this invention relates to such a probe which may be utilized to follow surfaces of compound curves without touching the surface and to the method of using the probe to achieve this result. That is to say, this invention relates to a capacitance probe which is sensitive to the proximity of a surface over arcs in excess of 180° lying in orthogonal planes and a method of using such a probe.

The particular capacitance probe and method of utilizing it was conceived to meet the problem of finding a sensing element for a contour following device which element is capable of following the surface of a dielectric material without actually touching the surface. The automotive industry, for example, needs such a contour follower for automatically cutting templates representing cross sections of automobile body shapes which are modeled in clay. It will be recognized, however, that the instant capacitance probe and method of utilizing it is capable of more general use and not limited specifically to this application.

If a probe is to be utilized for determining a change in distance or displacement by sensing the parameter capacity and if it is to be capable of following surfaces which are made up of compound curves, i.e., sensing the proximity of a surface over arcs in excess of 180° lying in orthogonal planes, the sensing element must be of a configuration not previously known in the art and certain new methods and techniques must be employed.

Accordingly, it has been an object of this invention to provide a probe sensitive to the proximity of a surface over arcs in excess of 180°.

A further object of this invention is to provide a probe which is sensitive to the proximity of a surface over arcs in excess of 180 degrees lying in orthogonal planes.

A further object is to provide a new method of utilizing capacitance probes which renders the probe more sensitive for measuring distances or indicating proximity to a surface.

Still a further object of this invention is to provide a method of following contours of surfaces which are made up of compound curves.

In accordance with this invention, a capacitance probe is moved along a surface at a given distance therefrom. Any change in capacitance of the probe indicates that the distance between the probe and the object has changed. Consequently, the position of the probe may be adjusted to bring the capacitance measured or observed to the proper value and thus the probe is brought within the proper distance from the surface being followed. Since the change in capacitance with distance for most probes is small, and very small capacitance changes are difficult to measure, it is contemplated in one embodiment of this invention to mechanically vibrate the probe through an appropriate small amplitude either in a circle lying in the plane of probe motion or in a line having an appropriate angle with respect to the vertical to facilitate the measurements. When the probe is vibrating in space remote from the dielectric surface the capacitance of the probe is constant, however, when it is vibrated near a dielectric surface the capacitance changes during a cycle of vibration with a magnitude dependent upon the distance from the surface. Ordinarily it is expected that the probe will be in air and that the dielectric constant of the surface being followed will be considerably greater than that of air. However, still further greater sensitivity is obtained by immersing both the surface and the probe in a dielectric material such as water which has a dielectric constant of about 80. A decrease in capacitance is then observed when the probe is brought close to the surface if the composition of the surface has a dielectric constant less than that of the surrounding material. Consequently, the position of the probe may be adjusted as previously described.

In accordance with one aspect of this invention, special capacitance heads are provided for the probe which are sensitive to the proximity of arcs in excess of 180 degrees and the capacitance of the sensing elements or heads is observed by utilizing a device which is sensitive to very small changes in capacitance.

The novel features which are believed to be characteristic of this invention are set forth with particularity in the appended claims. The invention itself, however, both as to its organization and method of operation together with further objects and advantages thereof may best be understood by reference to the following description taken in connection with the accompanying drawing in which:

Figure 1 is a perspective view in partial section of a capacitance probe constructed in accordance with one aspect of this invention and a schematic diagram of circuitry for determining the capacitance of the probe sensing element; and Figure 2 is a perspective view of a capacitance head for a capacitance probe of a different embodiment of the invention.

Referring now specifically to Figure 1 of the drawing, an object 10 having a compound surface which is to be followed and reproduced is shown. A capacitance probe 11 is utilized to follow the contour of the surface without contacting it. The entire probe 11 consists of the capacitance head 12 which is utilized as the sensing element, the vibrating motor 13 which may be utilized to vibrate the capacitance head 12 in a direction longitudinal to the supporting rod 14 which is connected at its upper end to the armature of the vibrator motor 13 and which is connected at its lower end to the capacitance head 12, and a handle 15 which may be utilized to hold the probe and move it along the surface to be followed.

In order to follow the contour of a compound surface, the capacitance head, or sensing element must be sensitive to the proximity of a surface in any direction. Laboratory tests show that the capacitance head 12 is sensitive to the proximity of a dielectric surface in almost any radial direction and therefore it is possible for the head 12 to follow the surfaces of compound curves. The capacitance head 12 consists of a hollow sphere of conducting material cut into four equal segments 12a, 12b, 12c, and 12d by two perpendicular planes which pass through the center of the sphere. Opposite pairs of the segments such as 12a and 12d, and 12c and 12b are rigidly connected together by the U-shaped conducting rods 16 and 17. As is explained more fully subsequently, the capacitance between the pairs of segments is observed by a device which is sensitive to very small changes in capacitance.

The capacitance head tested was approximately 3/16 of an inch in diameter with a spacing between the segments 12a, 12b, 12c and 12d of .005 inch. It was found that very small changes in the distance between the capacitance head and the surface to be followed resulted in changes of capacitance on the order of 1/100 of a micromicrofarad. These results were obtained with the probe at its intended distance of approximately .01 of an inch from the surface of a clay model. The dielectric constant of the clay was approximately 5.

Although capacitometers are available on the market which are sensitive to changes of 1/100 of a micro-microfarad, it was found that most of these capacitometers drift and therefore are not stable enough to measure the small values of capacitance encountered continuously. A method of overcoming this problem was devised which consists of vibrating the capacitance head 12 through an appropriately small amplitude, for example, .005 inch, either in a circle lying in the plane of probe motion or in a line having an appropriate angle with respect to vertical. When the capacitance head 12 is vibrating in a space remote from the dielectric space the capacitance of the head 12 is constant. However, when it is vibrating near a dielectric surface such as the compound dielectric surface 10, the capacitance will change during a cycle of vibration with a magnitude dependent upon the distance from the surface. The average of this capacitance can then be measured and the effect of drift thus eliminated.

In order to provide the vibration for the capacitance head 12 the rigid U-shaped conducting rods which connect the opposite segments of the conducting sphere 12 are connected to the non-conducting rod 14 which is an extension of the armature of the vibrating motor 13. The U-shaped conducting rods 16 and 17 may be connected in any suitable manner, however, as illustrated, they are shown imbedded in the rod 14 which may be a plastic compound.

The direction of vibration is not critical and the particular vibrator is not of prime importance. The particular vibrator motor illustrated is a conventional speaker motor. The motor 13 consists of a stator 18, armature 19, an armature winding 20, and face plate 9. The stator 18 is a solid of revolution which is substantially E-shaped in cross section and is magnetized in such a manner that the outer portion 18a is of one polarity and the center portion 18b is of the opposite polarity. The center portion 18b of the stator 18 is surrounded by the armature 19 which is a non-conducting, non-magnetic cup-shaped member. Armature 19 is provided with an internally threaded aperture at its closed end which receives the externally threaded upper end of rod 14. The armature winding 20 is wound around armature 19 and is provided with leads 20 and 21 which are connected to a source of alternating current (preferably 60 cycles). When the armature winding 20 is energized from the alternating current source, the armature 19 vibrates longitudinally on the center leg portion 18b of the stator 18, thus vibrating the capacitance head 12. The face plate 9 covers the entire front of the motor 13 and is clamped to the stator 18 by means of ears 9a around its outer periphery. The face plate 9 also holds the armature 19 in place in the motor and determines its throw. An aperture 9b is provided in the center of the face plate to permit entry of the rod 14.

In order to measure the change in capacitance of the capacitance head 12 the segments of the head are connected by means of leads 23 and 24 to a pair of terminals 25 and 26 which are connected in one ratio arm of a bridge circuit 27. The bridge circuit 27 is provided with a pair of input terminals 28 and 29, a pair of output terminals 30 and 31, a pair of resistors 32 and 33 connected in adjacent bridge arms wtih one input terminal 29 at the junction therebetween, and a variable capacitor 34 and the capacitance head 12 in the opposite two bridge arms.

The bridge circuit 27 is energized from a source of alternating voltage 35 connected between the input terminals 28 and 29. The alternating voltage source 35 is preferably of a high frequency, such as 100 kc. In order to measure the output from the bridge circuit a conventional peak detector 36 (such as the one illustrated in volume 19 of the Massachusetts Institute of Technology Radiation Laboratory Series, entitled "Wave Forms," in Figure 14–6a on page 506) is connected across the output terminals 30 and 31 of the bridge circuit, and the output of the peak detector 36 is connected to a peak reading voltmeter 37. The peak detector effectively strips the output wave of the carrier frequency, i.e. the 60-cycles at which the capacitance head 12 is being vibrated, and gives an output voltage which represents the envelope of the carrier wave. The peak reading voltmeter 37 then will read only the magnitude of the capacitance change and, as was previously described, can be made to read the distance of the capacitance head from the surface.

The bridge circuit 27 shown in Figure 1 is utilized in what is known as De Sauty's method of comparing two condensers which is shown and described in a number of elementary textbooks such as "The Alternating Current Bridge Method," by B. Hague, Pittman Press, Great Britain, 1923, pages 194–196. In order to obtain maximum sensitivity, the standard capacitor 34 should be equal to the capacitance of the capacitance head 12 when it is in space and the resistor elements 32 and 33 should be non-inductive. It will, of course, be understood that this method of measuring the capacitance of the capacitance element 12 is only one of many that could be employed. For example, any capacitance bridge circuit may be adapted for the application, or the capacitance element 12 could be used in the tuning circuit of an ordinary Hartley oscillator. Variations in capacitance of the element 12 due to variations in distance between the capacitance head and the surface 10 causes variations in frequency of oscillation of such an oscillator. The change in frequency could then be measured and utilized to indicate the distance between the capacitance head 12 and the surface 10.

As has been previously indicated, it is not necessary in all instances to vibrate the capacitance head 12. If this head is not vibrated, it is not necessary to use the peak detector 36 and peak reading voltmeter 37 but a simple current measuring meter may be connected directly between the output terminals 30 and 31 of the bridge circuit 27 and this meter may be calibrated to read the distance between the capacitance head 12 and the surface 10 directly.

A method of increasing the sensitivity of the apparatus is to immerse both the capacitance head 12 and the surface 10 to be followed in a material with a dielectric constant substantially different from that of the surface being followed. For example, it is ordinarily expected that the capacitance head 12 will be in air which has a dielectric constant of 1 and the surface 10 will be of a material with a dielectric constant of about 5. However, if the surface and the capacitance head 12 are both immersed in a dielectric material such as water which has a dielectric constant of about 80, a greater change in capacity is observed when the probe is brought closer to the surface. However, in this case it is noted that the capacity of the probe decreases as it approaches the surface 10 due to the fact that the dielectric of the medium in which the capacitance head 12 is immersed is considerably higher than that of the dielectric of the material which makes up the surface 10, whereas if the capacitance head 12 is in air the dielectric of the medium in which the capacitance head is immersed is lower than that of the material which makes up the surface 10.

An alternative embodiment of the capacitance head is illustrated in Figure 2 where a capacitance head 40 is illustrated which consists of two conducting cylinders, 40a and 40b. Satisfactory results have been obtained using cylinders approximately 3/16 of an inch in diameter and 1/8 inch long mounted end to end along the same axis and spaced approximately .005 inch apart. A pair of stiff conducting rods 41 and 42 are connected to the cylinders 40a and 40b respectively. These leads are brought out to the rod 14 of a probe 11 as illustrated in Figure 1. A pair of conducting leads 43 and 44 respectively may then be brought out to terminals 25 and 26 which may be connected in a bridge circuit also as illustrated in Figure 1. The capacitance head 40 is intended to be used to follow the contour of a surface 10 as described with respect to the capacitance head 12 and the surface 10 of Figure 1. If the conducting and supporting rods 41 and 42 are connected to the terminals 25 and 26 of the capacitance bridge then the change in capacitance may be utilized to indicate the change in distance between the capacitance head 40 and the surface 45.

The capacitance head 40 is not as versatile as the spherical capacitor head 12 since the head has a finite length. If this type of capacitance head is to be effective for following curves which lie in an orthogonal plane, the length of the probe must be small relative to the radius of curvature of the curves. However, this type of capacitance head has proved satisfactory for many applications.

While particular embodiments of this invention are shown and described, it will, of course, be understood that the invention is not limited thereto since many modifications both in the circuits of arrangements employed and in the instrumentalities employed may be made. It is contemplated by the appended claims to cover any such modifications as fall within the true spirit and scope of this invention.

What I claim as new and desire to secure by Letters Patent of the United States is:

1. The method of following the contour of the surface of an object which has a dielectric constant different from the surrounding medium which method includes the steps of moving a capacitor in close proximity to the surface to be followed, sensing a change in distance between the surface and said capacitor by sensing the changes in capacitance of said capacitor, and moving said capacitor toward and away from the surface to maintain a selected average value of capacitance.

2. The method of following the contour of the surface of an object which has a dielectric constant different from the surrounding medium which method includes the steps of moving a capacitor in close proximity to the surface to be followed, vibrating said capacitor through a space small relative to the distance between it and said object whereby its distance from said surface is cylically changed and its capacitance is cyclically varied, sensing a change in distance between the surface and said capacitor by sensing the changes in amplitude of variation of capacitance of said capacitor during such vibration, and moving said capacitor toward and away from the surface to maintain a selected average value of capacitance.

3. The method of following the contour of the surface of an object which method includes the steps of immersing said object in a medium having a substantially different dielectric constant from the object, moving a capacitor in close proximity to the surface to be followed, sensing a change in distance between the surface and said capacitor by sensing the changes in capacitance of said capacitor, and moving said capacitor toward and away from the surface to maintain a selected average value of capacitance.

4. The method of following the contour of the surface of an object which method includes the steps of immersing said object in a medium having a substantially different dielectric constant from the object, moving a capacitor in close proximity to the surface to be followed, vibrating said capacitor through a distance small relative to the distance between it and the object whereby its distance from said surface is cyclically changed and its capacitance is cyclically varied, sensing a change in distance between the surface and said capacitor by sensing the amplitude of the changes in capacitance of said capacitor during said vibrations, and moving said capacitor toward and away from the surface to maintain a selected average value of capacitance.

5. A capacitance head including a hollow sphere of conducting material made up of four spaced segments, and a pair of rigid conducting rods, each of said rods connecting two oppositely disposed spaced segments, said four segments being defined by two perpendicular planes of insulating material each passing through the center of said hollow sphere with each pair of oppositely disposed segments being electrically interconnected and each set of interconnected segments being connected to a respective output terminal.

6. A capacitance probe means for following the contour of the surface of an object without contacting the surface, comprising a capacitance head, including a hollow sphere of conducting material made up of four spaced segments, said four segments being defined by two perpendicular planes of insulating material each passing through the center of said hollow sphere with each pair of oppositely disposed segments being electrically interconnected and each set of interconnected segments being connected to a respective output terminal, vibrating means and a capacitance sensing means electrically connected to the output terminals of said capacitance head to determine the capacitance of said head, said capacitance head being connected to be vibrated by said vibrating means whereby the distance between said capacitance head and the surface is cyclically varied.

7. A capacitance probe means for following the contour of the surface of an object without contacting the surface, said probe means comprising a capacitance head including two hollow conducting cylinders having a common axis and positioned end to end with an air gap intermediate the two ends, vibrating means, and a capacitance sensing means electrically connected to said capacitance head to determine the capacitance of said head, said capacitance head being connected to be vibrated by said vibrating means whereby the distance between said capacitance head and the surface is cyclically varied.

8. A capacitance probe means for following the contour of the surface of an object without contacting the surface, comprising a capacitance head, including a hollow sphere of conducting material made up of four spaced segments, said four segments being defined by two perpendicular planes of insulating material each passing through the center of said hollow sphere with each pair of oppositely disposed segments being electrically interconnected and each set of interconnected segments being connected to a respective output terminal, and a capacitance sensing means electrically connected to the output terminals of said capacitance head to determine the capacitance of said head.

9. A capacitance head comprising a sphere having a surface divided into different conducting areas, said areas being insulated from each other, a pair of terminals, one of said terminals being connected to alternate areas and the other terminal being connected to the remaining areas whereby the capacity of said head as measured between said terminals varies with the proximity of said sphere in any direction to objects of different dielectric properties.

References Cited in the file of this patent

UNITED STATES PATENTS

| | | |
|---|---|---|
| 1,701,975 | Gunn | Feb. 12, 1929 |
| 1,984,166 | Walter | Dec. 11, 1934 |
| 2,025,719 | Blau et al. | Dec. 31, 1935 |
| 2,032,016 | Hitner | Feb. 25, 1936 |
| 2,108,766 | Fischer | Feb. 15, 1938 |
| 2,280,678 | Waymouth | Apr. 21, 1942 |
| 2,523,341 | Terry et al. | Sept. 26, 1950 |
| 2,555,977 | Kline | June 5, 1951 |
| 2,633,028 | Fillebrown | Mar. 31, 1953 |
| 2,658,173 | Reese | Nov. 3, 1953 |
| 2,754,478 | Goldsmith | July 10, 1956 |
| 2,759,134 | Sullivan | Aug. 14, 1956 |
| 2,802,178 | Shafer et al. | Aug. 6, 1957 |
| 2,824,281 | Radnor | Feb. 18, 1958 |
| 2,830,114 | Carlson | Apr. 8, 1958 |